C. C. SHEELEY & F. J. GRUENEWALD.
WOODWORKING MACHINE.
APPLICATION FILED JULY 26, 1909.
1,108,854.
Patented Aug. 25, 1914.
6 SHEETS—SHEET 1.
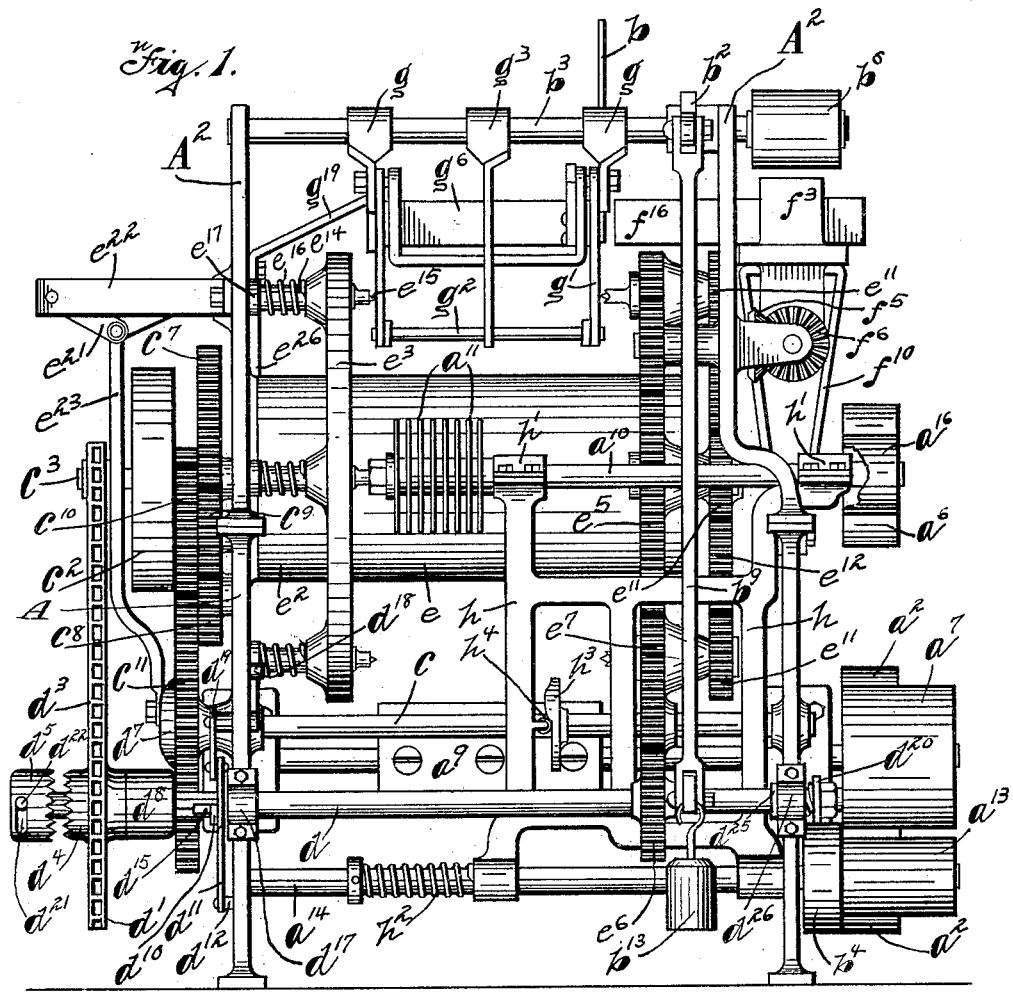

C. C. SHEELEY & F. J. GRUENEWALD.
WOODWORKING MACHINE.
APPLICATION FILED JULY 26, 1909.
1,108,854.
Patented Aug. 25, 1914.
6 SHEETS—SHEET 2.
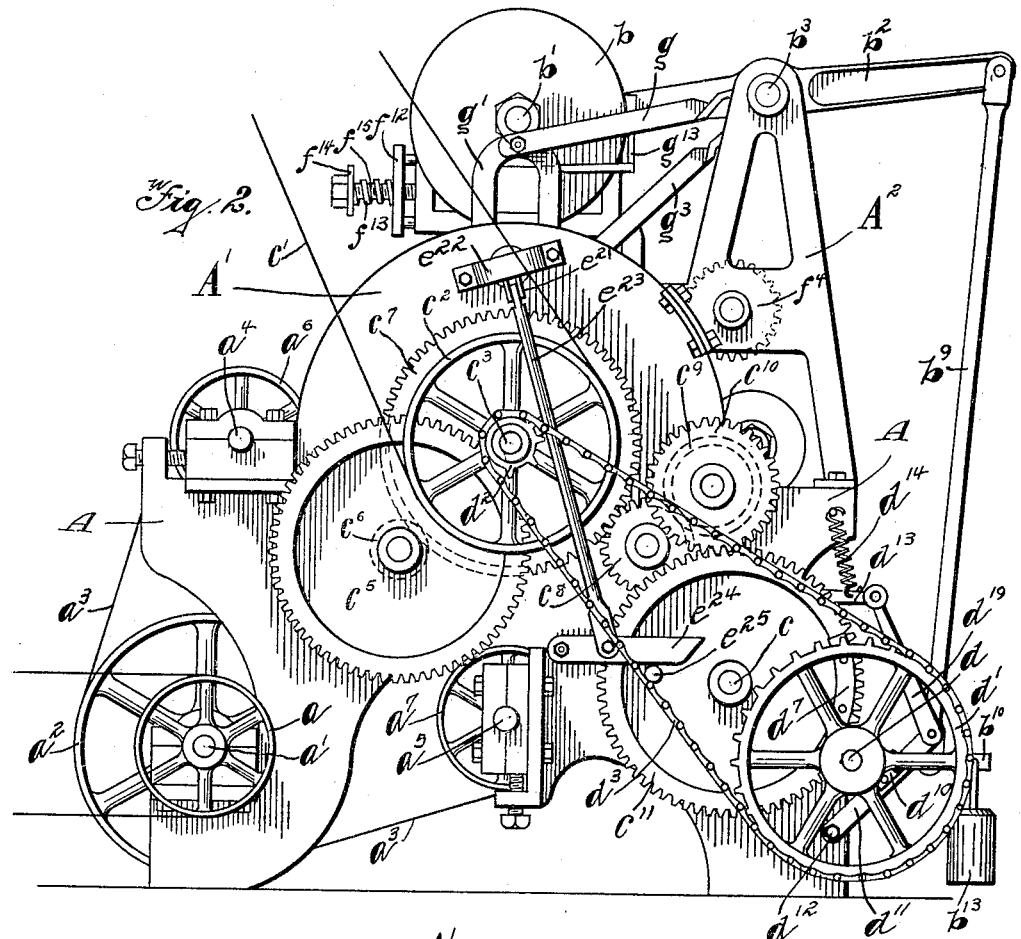
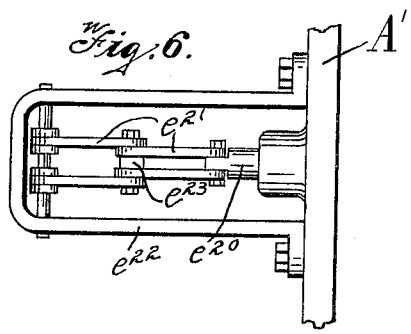
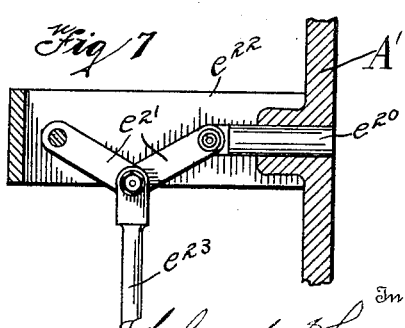

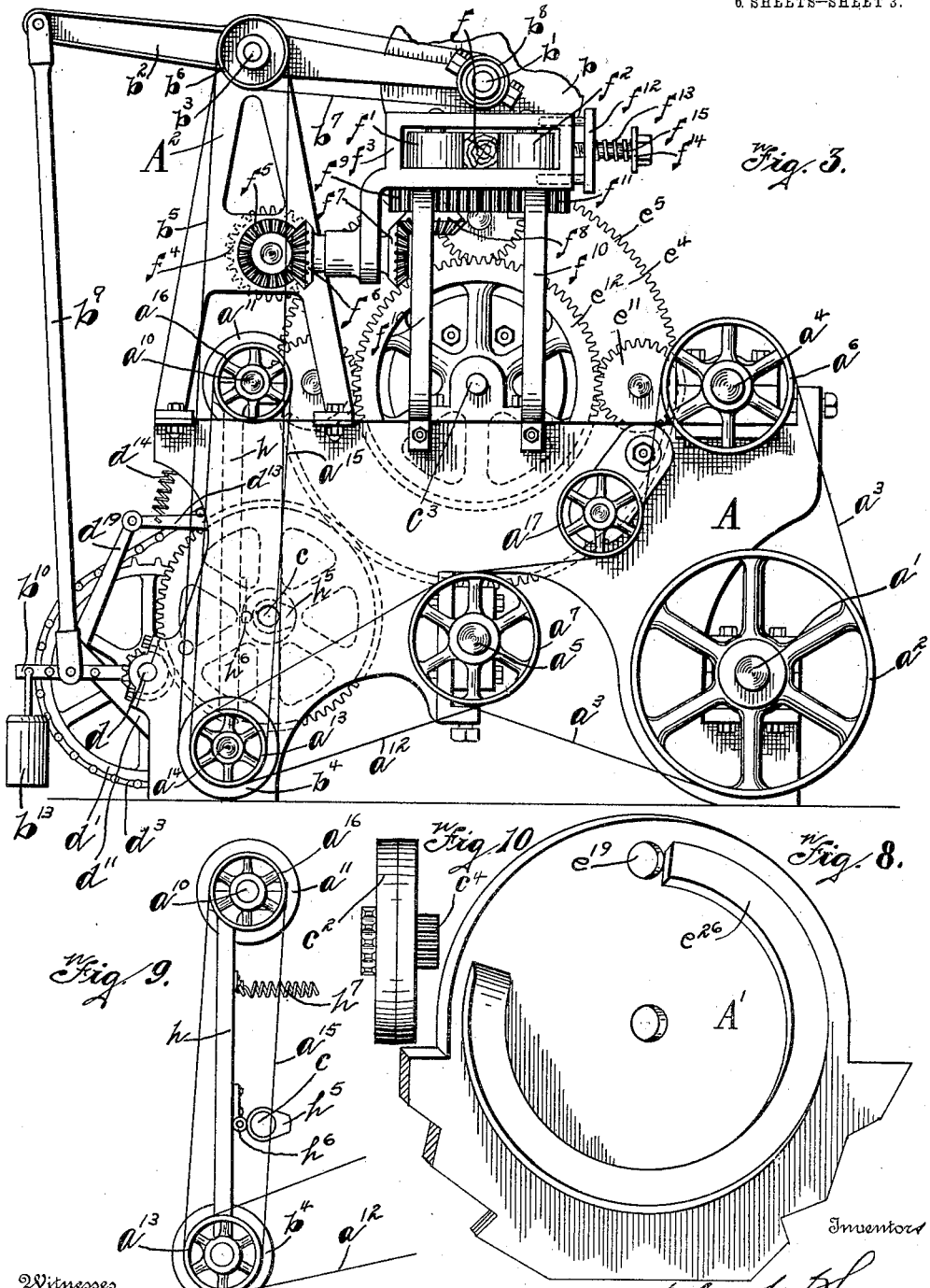

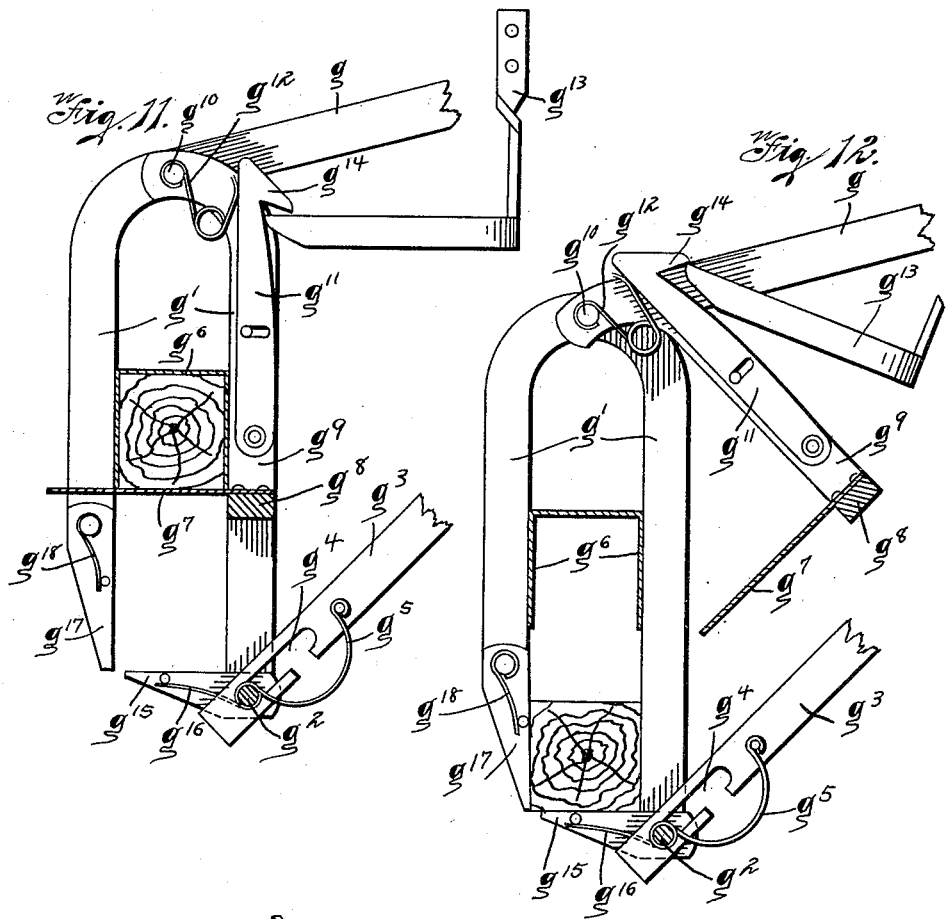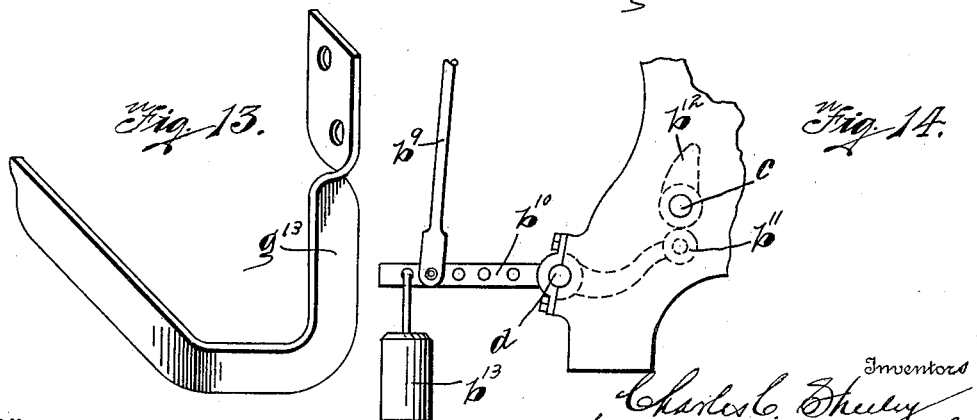

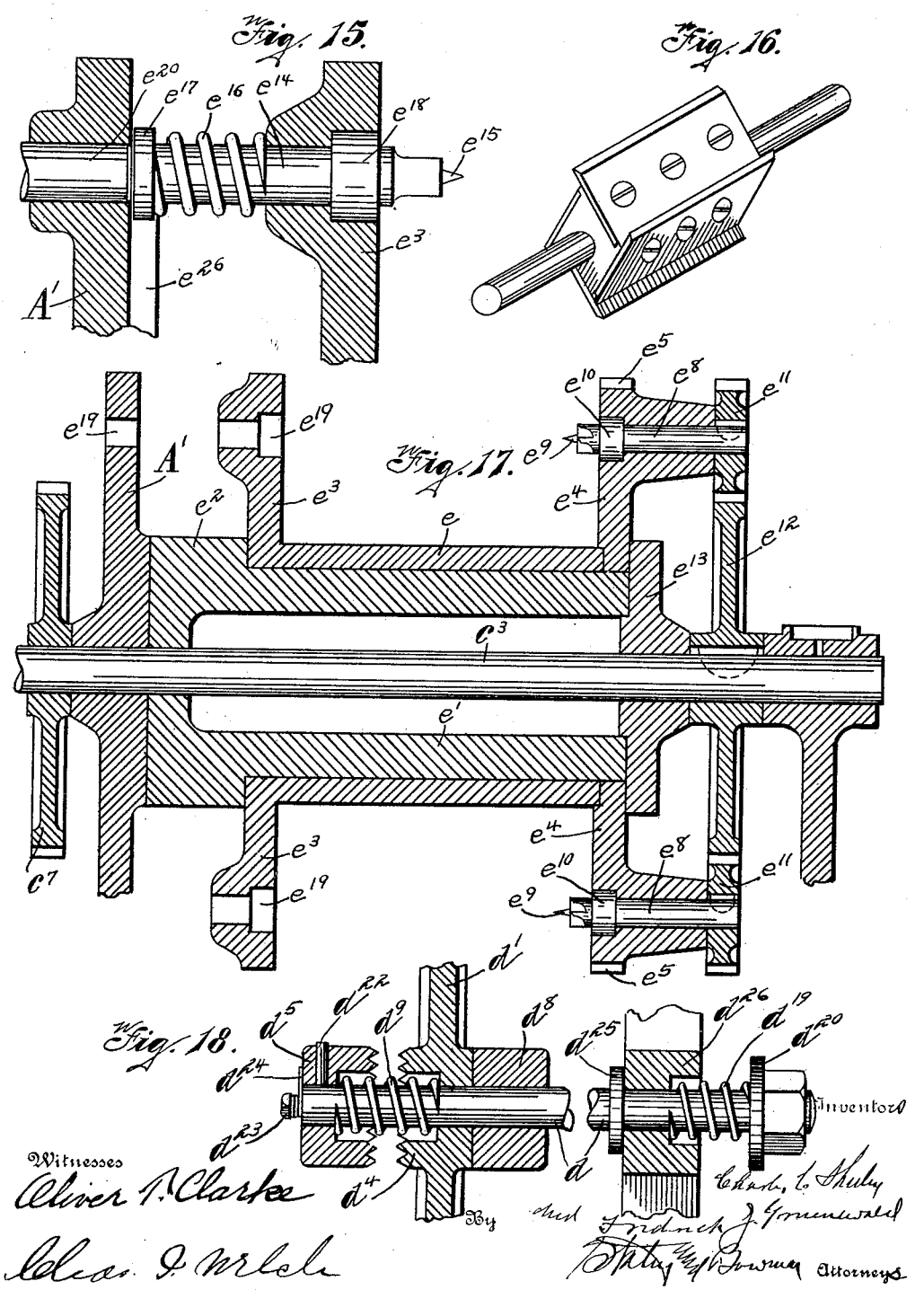

C. C. SHEELEY & F. J. GRUENEWALD.
WOODWORKING MACHINE.
APPLICATION FILED JULY 26, 1909.
1,108,854.
Patented Aug. 25, 1914.
6 SHEETS—SHEET 6.
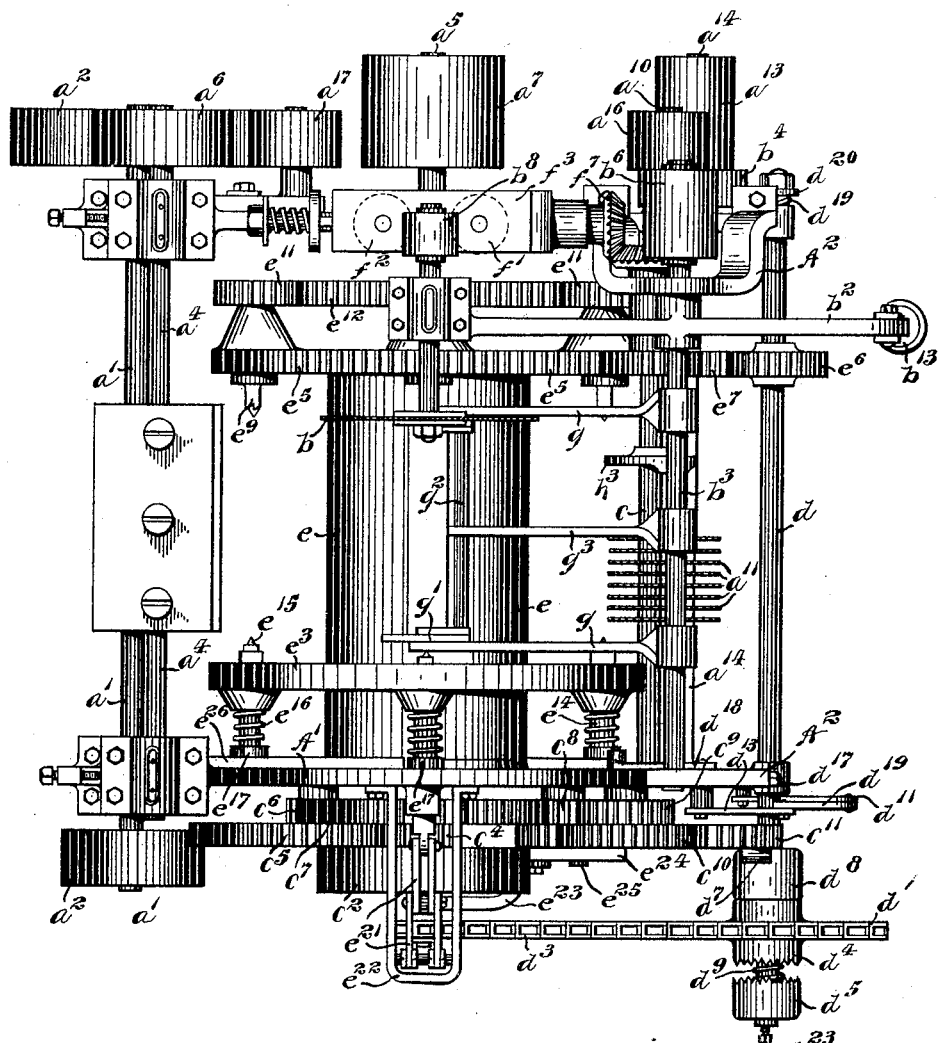
Fig. 19.
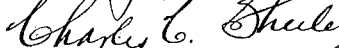
THE NORRIS PETERS CO., PHOTO-LITHO., WASHINGTON, D. C.

UNITED STATES PATENT OFFICE.

CHARLES C. SHEELEY, OF HARSHMAN, AND FREDRICK J. GRUENEWALD, OF DAYTON, OHIO.

WOODWORKING-MACHINE.

1,108,854.  Specification of Letters Patent.  Patented Aug. 25, 1914.

Application filed July 26, 1909. Serial No. 509,552.

*To all whom it may concern:*

Be it known that we, CHARLES C. SHEELEY, a citizen of the United States, residing at Harshman, Montgomery county, Ohio, and FREDRICK J. GRUENEWALD, a citizen of the United States, residing at Dayton, in the county of Montgomery and State of Ohio, have invented certain new and useful Improvements in Woodworking-Machines, of which the following is a specification.

This invention relates to improvements in wood working machines, and it especially relates to a machine for turning wood to various shapes which will be automatic in its operation.

The object of the invention is to provide an automatic machine for turning wood which will be simple in its construction and efficient in its operation.

The invention consists in the construction and combinations of parts hereinafter described and set forth in the claims.

In the accompanying drawings, Figure 1 is a rear elevation of a machine embodying the invention. Fig. 2 is an elevation of the right-hand side of the machine. Fig. 3 is an elevation of the opposite side of the machine. Figs. 4 and 5 are detail views of the clutch mechanism for starting and stopping the operating shaft for some of the parts. Figs. 6, 7 and 8 are details of some of the devices for engaging and carrying the work. Fig. 9 is a detail of the devices for operating the thread saws. Fig. 10 is a detail of one part of the driving mechanism. Figs. 11, 12 and 13 are details of part of the feeding mechanism for the work. Fig. 14 is a detail of a part of the mechanism for operating the cut off saw. Fig. 15 is a detail in section of one of the tailstocks. Fig. 16 is a detail of one of the cutting tools. Fig. 17 is a detail in section of the work-carrier and some of the connected parts. Fig. 18 is a detail in section of the intermittently rotating shaft and its clutch mechanism. Fig. 19 is a plan view of the machine.

Like parts are represented by similar characters of reference in the several views.

The machine which we have devised may be adapted for turning a great variety of different kinds of work to any shape desired. The machine which we have shown in the drawings is set for turning the ordinary wooden insulating pins now in common use and employs two sets of cutters and one set of threading cutters. These cutters and threading cutters are revolved continuously at a great speed by mechanism which operates independently of the driving mechanism for the other operating devices, which last-mentioned devices are arranged to operate intermittently. As the strip of wood is fed into the machine it is sawed off into proper lengths by what we will term the cut-off saw, which is also continuously driven at a high speed. After being sawed off, the billets of wood are grasped by an intermittently rotating carrying device which carries it into proper position to be operated upon by the cutting tools and then finally discharges it into a suitable receptacle. In the present machine, this rotating carrying device is arranged to be stopped and started each one-fourth revolution and is provided with four sets of devices for grasping and holding the work, this rotating carrier and its grasping and holding devices corresponding somewhat to the headstock and tailstock of the ordinary lathe. Means are also provided for rotating the work at the point where it is being operated upon by the cutting tools. In the operation of this carrier and its grasping and holding devices, four different billets of work are being operated upon at the same time; that is, one set of the grasping and holding devices will be in the act of grasping the length of work which has been sawed off last, the next set will be holding and rotating a billet of wood before the first cutting device; the next set will likewise be holding and rotating a length of work before the next or second cutting device, and the last set will be holding and rotating a length of work before the threading cutters. During the period at which the lengths of wood are held before the respective cutting and threading devices, the wood will be rotated something over one revolution to insure the cutting devices acting upon the entire circumference of the same.

*Operating devices for the cutters.*—As before stated, in the present machine there are two sets of cutters and one set of threading cutters, rotated continuously. These are equally spaced about the rotating carrier, one set of cutters preferably at the front of the carrier, one set beneath the carrier, and the set of threading cutters at the rear of the carrier; the feeding devices, the cut-off saw, and the hopper or holder for the work before being taken up by the carrier being located above the carrier. The power to drive these cutting and threading devices is applied to the pulley, $a$ (Fig. 2) secured to the transverse shaft, $a^1$, located in suitable bearings in the lower front part of the main frame, A. The opposite end of this shaft has a large pulley, $a^2$, (Fig. 3) about which passes the belt, $a^3$, which drives the cutter shafts $a^4$ and $a^5$, through the medium of the pulleys $a^6$ and $a^7$, secured to the respective shafts; one of these shafts being located at the front of the machine and carrying the first set of cutters, $a^8$, (see Fig. 16 for detail) and the other shaft $a^5$, being located in the lower central portion of the machine and carrying the second set of cutters, $a^9$ (Fig. 1). The shaft, $a^{10}$, located at the rear of the machine in line with the shaft, $a^4$, carries the series of threading cutters $a^{11}$, (Fig. 1) and is driven from the pulley, $a^7$, through the medium of the belt, $a^{12}$, driving the pulley, $a^{13}$, on the stationary shaft $a^{14}$, belt $a^{15}$ and pulley $a^{16}$ on said threading cutter shaft $a^{10}$. $a^{17}$ is an adjustable idler pulley for the belt $a^3$.

*Driving devices for cut-off saw.*—As previously stated the cut-off saw is located at the upper part of the machine. This saw, represented by $b$, is secured to the shaft $b^1$ (Figs. 2 and 3) located in suitable bearings at the end of a pivoted rocker-arm $b^2$, pivotally supported on a rod $b^3$, located in a suitable support A$^2$ secured to the main frame. The shaft $a^{14}$ previously referred to, carries a pulley $b^4$, which continuously drives the saw through the medium of the belt, $b^5$, pulley $b^6$, loosely supported on the rod, $b^3$, belt $b^7$ and pulley $b^8$, secured to the saw-shaft $b^1$. By this means the saw is continuously revolved at a high speed.

*Driving devices for cam-shaft and intermittently rotating shaft.*—What we will term the cam-shaft is represented by $c$ (Figs. 1, 2, 3 and 9). This cam-shaft is located at the lower rear part of the machine and has secured thereto a series of cams for throwing certain of the parts into operation at the proper time as will be hereinafter more fully described. This shaft is driven from the driving belt, $c^1$, (Fig. 2) through the medium of the pulley $c^2$, loose on the shaft $c^3$, which extends transversely across the machine, pinion $c^4$ secured to said pulley (see Fig. 10) gear $c^5$ loosely journaled on the frame, pinion $c^6$ secured to the hub of said gear $c^5$, gear $c^7$ meshing with said pinion and fast on the shaft $c^3$, small gear $c^8$ loosely journaled on the frame and meshing with said gear $c^7$ and also with a pinion $c^9$ (shown in dotted lines), and gear $c^{10}$ secured to said pinion $c^9$ and meshing with the large gear $c^{11}$, which gear $c^{11}$ is secured to said cam-shaft $c$. By this train of gearing the said cam shaft is continuously rotated at a greatly reduced speed, this speed in the present machine being one-twelfth as fast as the pulley $c^2$. The intermittently rotating shaft, $d$, has loosely mounted thereon a sprocket-wheel $d^1$ (Figs. 1 and 4) which is continuously driven from said pulley $c^2$ through the medium of the sprocket-wheel $d^2$, secured to said pulley, and the sprocket-chain $d^3$. Means are provided for automatically throwing the shaft $d$ into engagement with this continuously rotating sprocket-wheel, $d^1$, and causing it to rotate therewith for one-fourth revolution of the carrier and for automatically disengaging it therefrom, but before describing this start-and-stop mechanism we will first describe the work carrier devices, which devices are driven by said shaft, $d$, and form means for disengaging said shaft from its driving sprocket at proper intervals.

*Work carrier.*—The main body of the carrier consists of a spool $e$ (Fig. 17 for detail) mounted upon a bearing, $e^1$, secured to a portion A$^1$ of the main frame, which bearing preferably has a collar or enlarged portion $e^2$ against which one end of the spool is seated. The spool has at each end a disk, $e^3$ and $e^4$, the one $e^4$ having gear teeth $e^5$ arranged about its periphery. Secured to the intermittently operated shaft, $d$ is a gear $e^6$ (see Fig. 1) which drives the carrier through the medium of the intermediate gear $e^7$, meshed with the gear teeth $e^5$; the proportion of the gears being such that the carrier will be rotated preferably at about $\frac{3}{4}$ the speed of the shaft $c^3$, previously referred to.

Rotatably journaled in the disk, $e^4$, of the carrier are a series of four of what we will term headstocks, $e^8$, equally spaced apart, the inner ends of which project a suitable distance beyond the side of the disk and have biting projections or teeth $e^9$, as shown. Each of the headstocks has a stop collar $e^{10}$, at its inner end located in a recess in the disk, and the outer ends of these headstocks are provided with pinions, $e^{11}$, which mesh with a gear $e^{12}$ (Figs. 1, 3 and 17) secured to the shaft $c^3$, this shaft being journaled in the frame part A$^1$ and bearing $e^1$ at one end, and in a bearing $e^{13}$ at the other end; said bearing $e^{13}$ being in the nature of a plate which is secured to the bearing $e^1$ and serves also to retain the carrier on its bearing, said disk $e^4$ being preferably formed separate from the spool, $e$. The result of this construction is that every time the carrier is stopped, the respective headstocks will be caused to revolve by reason of the continuously rotating gear $e^{12}$ meshing with the respective pinions $e^{11}$, for the purpose hereinafter referred to. The opposite disk $e^3$ is provided with a series of four plungers (Fig. 1 and also Fig. 15 for detail) which correspond to the tailstock of a lathe. Each of these plungers or tailstocks is provided with a point $e^{15}$ for engagement with the work and are normally spring-pressed away from engaging position by a spring $e^{16}$, located between the disk, $e^3$, and a collar $e^{17}$ on the said plunger; the plunger being provided with a second collar, $e^{18}$, located in a recess, $e^{19}$, in the disk to form a stop. The respective tailstocks are located directly opposite the headstocks and coöperate therewith in the manner more fully described. Each of these tailstocks is adapted, at a certain point in each complete revolution, to be pressed inwardly for the purpose of engaging the work and to be held in engaging position for nearly the complete revolution of the carrier and then be automatically released and pressed back to disengaging position by its spring. Located in an opening $e^{19}$ of the frame part $A^1$ is a plunger $e^{20}$, the location of this plunger being such that the inner end thereof will lie adjacent the end of each of the tailstocks $e^{14}$ at a certain point in the revolution of the disk $e^3$. The outer end of the plunger is connected to a toggle-jointed lever, $e^{21}$ (see Figs. 1, 2 and 7) pivoted in a frame, $e^{22}$, and pivotally connected by a link, $e^{23}$, to a pivoted lever $e^{24}$, which lies in the path of a pin $e^{25}$, on the rotating gear $c^{11}$. The gear, $c^{11}$ revolves four times as fast as the tailstock carrying disk, $e^3$, and the adjustment of the parts is such that as each of the tailstocks reaches a certain point in the revolution of the disk, $e^3$, the plunger $e^{20}$ will be forced outwardly against said tailstocks and force them into engagement with the work. This operation takes place during one of the intermittent stops of the carrier before referred to and the carrier will immediately begin another intermittent movement by reason of the automatic starting devices which will be described presently. As soon as the carrier starts its movement, the tailstock will be held in engaging position with the work by a circular track, $e^{26}$, located about the inner side of the frame part $A^1$. (Figs. 1, 8 and 15) about which the ends of the tailstocks ride. This track begins at a point adjacent the opening $e^{19}$ and terminates at a point somewhat removed therefrom. As the end of the tailstock rides off the track it will be retracted by its spring and the work released and this operation will take place after the work has been acted upon by all of the cutting and threading devices.

*Start and stop mechanism for work carrier.*—As before stated the shaft, $d$, which drives the work-carrier has loosely running thereon a continuously rotating sprocket-wheel, $d^1$. The hub of this wheel is provided with a clutch face, $d^4$, and secured to the shaft, $d$, is an opposing clutch face, $d^6$. (See Fig. 1 and also Fig. 18 for detail.) The sprocket-wheel is capable of longitudinal movement on the shaft and at the proper time the clutch faces are thrown into engagement with each other by the cam, $d^7$, on the continuously revolving gear, $c^{11}$, contacting the collar, $d^8$, which encircles the shaft but is in no wise connected therewith; this collar lying adjacent the hub of the sprocket-wheel. A spring, $d^9$, tends to force the sprocket-wheel and its clutch face into disengaging position. The cam, $d^7$, is a comparatively short one and simply acts to throw the clutches into engagement. The clutches are held into engagement by a small block, $d^{10}$, on a lever, $d^{11}$, (Figs. 4 and 5) pivoted at $d^{12}$ to a suitable point on the frame at its lower end and pivotally connected at its upper end by a link $d^{19}$ to a bell-crank lever, $d^{13}$, also pivoted to the frame, and having a spring, $d^{14}$, which normally tends to pull the block, $d^{10}$, into position to hold the clutches into engagement, by providing a stop for a small block, $d^{15}$, located on a rod, $d^{16}$, connected with the collar $d^8$. The rod $d^{16}$ is extended through the bearing, $d^{17}$, for the shaft so as to keep the collar, $d^8$, from turning. The end of one arm of the bell-crank lever is provided with a rounded head $d^{18}$ which lies in the path of movement of the collars $e^{17}$ of the tail stocks $e^{14}$ and is adapted to be engaged thereby to withdraw the block $d^{10}$ and thus permit the clutches to become disengaged. When the block $d^{10}$ is withdrawn, it will be understood that the block $d^{15}$ will form a bar to its return to normal position, but that so soon as the block $d^{16}$ is withdrawn by the action of the cam $d^7$, the block $d^{10}$ will, by the action of the spring $d^{14}$ be drawn up into the path of movement of said block $d^{15}$ and thus hold the clutches in engagement. A spring $d^{19}$ (Fig. 18) arranged about the shaft, $d$, between one of its bearings $d^{26}$ and a collar $d^{20}$, secured to the shaft, permits the shaft and hence the clutch $d^5$, to yield if necessary to insure the proper engagement of the teeth of the clutches; a collar $d^{25}$ serving to limit its movement in one direction. We have also provided for permitting the clutch $d^5$ to have a limited rotating movement independent of the shaft to insure the teeth of the clutches being fully engaged before the load is brought upon the sprocket wheel, $d^1$, by providing the clutch $d^5$, with a slotted opening $d^{21}$, into which projects a pin $d^{22}$ secured in the shaft by a set-screw $d^{23}$; a spring $d^{24}$ secured to shaft through the medium of the set-screw and also to the clutch serving to normally hold the pin at one end of the slot. This construction will obviate any breakage which might occur by connecting the shaft with the sprocket wheel before the collar $d^8$ has ridden fully upon its cam.

By this construction it will be seen that inasmuch as the gear, $c^{11}$, revolves four times to every revolution of the carrier, the clutches will be thrown into engagement and the shaft $d$, started at each one-fourth of a revolution of said carrier and at the end of this one-fourth revolution the clutches will be disengaged by the means described and the carrier stopped thus causing the carrier to have intermittent movements of one-fourth revolution, corresponding to the number of engaging points for the work represented by the respective sets of headstocks and tailstocks.

*Feeding device for the work.*—As before stated, the work is fed to the machine in long strips. These strips are preferably square in cross-section and of a uniform size as far as height and width are concerned. The strips, indicated by reference character $f$ in Fig. 3, are fed between the rolls $f^1$ and $f^2$, (Fig. 3) which rolls are revolubly mounted in the supporting casting $f^3$ supported from the main frame by the brackets $f^{10}$. These feed rolls are driven from the intermittently rotating carrier heretofore described, so that the said rolls will have an intermittent feeding movement. Located in the supporting standard $A^1$ is a gear $f^4$, which is driven by the gear teeth $c^5$ of the carrier. This gear $f^4$ has integrally connected therewith a beveled gear $f^5$, which meshes with a beveled pinion $f^6$, which is connected to a shaft journaled in the casting $f^3$. The opposite end of the shaft has a beveled gear $f^7$ meshing with the beveled gear $f^8$ secured to a gear $f^9$, which gear $f^9$ is connected to the feed roll $f^1$. The feed roll $f^2$ also has a gear $f^{11}$ meshing with the gear $f^9$. The result of this construction is that at each intermittent movement of the work carrier, the feed rolls $f^1$ and $f^2$ will be rotated toward each other so as to cause the work to be fed into proper position to be operated upon by the machine, in the manner hereinafter more fully described. The feed roll $f^2$ is preferably arranged so as to be held yieldingly against the strip of wood to permit it to yield or slide if necessary to compensate for the varying size of the work and also for lack of proper adjustment of the stop for the work hereinafter referred to. As shown in Fig. 3 the journals of the yielding roll $f^2$ are mounted in slotted bearings in the casting $f^3$ and bearing against the journal of the roll is a yoke $f^{12}$ which is yieldingly held against said journals by a spring $f^{13}$ arranged between said yoke and a collar $f^{14}$ on a rod $f^{15}$ secured to the casting.

Arranged adjacent to the feed rolls $f^1$ and $f^2$ and supported by the casting $f^3$ is a guide $f^{16}$ (Fig. 1) of the same shape as the work, which guide extends in the proximity to a hopper or holder, into which hopper the work is fed and retained after being sawed off until such time as the carrier engages the same in the manner before described. This hopper or holder is shown in Figs. 1, 11, 12 and 13. Secured to the transverse rod $b^3$ before described are two projecting arms $g$. To the outer ends of these arms are pivoted two projecting U-shaped side frames $g^1$. The lower ends of these frames are connected by a transverse rod $g^2$, and the frames are further supported and secured by an arm $g^3$, also secured to the cross bar $b^2$. The arm $g^3$ is preferably connected to the cross-bar $g^2$ in a manner which will yieldingly hold said frames $g^1$ so that in case of any undue strain from any cause the frames will be permitted to yield slightly to obviate breakage. The lower end of the arm $g^3$ has therein a slotted opening $g^4$ which fits over the cross-bar $g^2$, and a spring $g^5$ secured to the cross bar $g^2$ and also to the arm $g^3$, normally under tension serves to yieldingly connect the said parts in a manner which will serve to steady and support the frames $g^1$ but at the same time permit them to yield if necessary. Secured to the respective frames $g^1$ coincident with the guide $f^{16}$ is a guide $g^6$, having a removable bottom $g^7$, this latter guide being conformed to the shape of the guide $f^{16}$. This removable bottom $g^7$ is secured to a swinging frame $g^8$, the side arms $g^9$ of which are pivoted to the upper parts of the frame $g^1$ as shown at $g^{10}$. Pivoted on one of the arms $g^9$ of this frame is a pawl $g^{11}$ normally pressed by a spring $g^{12}$ into position to be engaged by a finger $g^{13}$ secured to the rocker-arm $b^2$ before described. As will be more fully described hereinafter, this rocker-arm is given an intermittent rocking movement for the purpose of bringing the cut-off saw into and out of action. The result of the construction thus far described is that as the arm $b^2$ is rocked to lower the saw, the finger $g^{13}$ will ride over the beveled nose $g^{14}$ of the pawl $g^{11}$, and, as the rocker-arm returns, this finger will engage the nose of the pawl so as to carry the frame $g^8$ about its pivotal point and thus swing the movable bottom of the guide $g^6$ back to the position shown in Fig. 12. This permits the piece of work which has last been sawed off to drop down onto the fingers $g^{15}$, which fingers are pivoted on the rod $g^2$ and are normally spring-pressed by springs $g^{16}$ into the position shown in Figs. 11 and 12. Also pivoted to one side of each of the U-shaped frames $g^1$ (which side is shorter than the opposite side) is a yieldable finger $g^{17}$ normally spring-pressed by the spring $g^{18}$ into the position shown in Figs. 11 and 12. When the work is grasped by the respective headstocks and tailstocks of the carrier, as before described, these fingers $g^{15}$ and $g^{17}$ will yield and permit the work to be carried from the hopper or holder by the carrier. There is provided a stop $g^{19}$, for the strip of wood, on one side of the side frames, $g^1$, at the end of the guide-way $g^6$.

*Cut-off saw.*—As before stated the cut-off saw, $b$ is mounted at the end of the rocker-arm $b^2$ and continuously driven in the manner before explained. This saw, as shown in Fig. 1, stands in a plane directly in line with the space between the adjacent ends of the guides $g^6$ and $f^{16}$. The opposite end of the rocker-arm, $b^2$, from the saw is connected by a link $b^9$ with a lever $b^{10}$ (Fig. 14 for detail) which lever is pivoted loosely on the shaft $d$. The opposite end of the lever is provided with a friction roller $b^{11}$, shown in dotted lines in Fig. 14, which roller is adapted to be engaged by a cam projection $b^{12}$ on the cam shaft. A weight $b^{13}$ normally holds this lever in the position shown in Fig. 14, in which position the saw $b$ will be held in its inoperative position. By this construction, after the proper length of the work has been fed into the hopper and the feed rolls are at rest, the cam contacting the friction roll on the lever will operate the rocker arm $b^2$ to tilt the saw to the proper position to cause it to saw off a piece of the strip of wood, and as soon as the cam $b^{12}$ has passed over the friction roll the weight $b^{13}$ will immediately bring the saw back into its normal inoperative position.

*Threading saws.*—As before stated, the threading cutters $a^{11}$, are mounted upon a shaft $a^{10}$ and continuously revolved in the manner before explained. This shaft $a^{10}$ is mounted in bearings $h^1$ at the upper end of a movable frame $h$, which frame is pivoted at its lower end on the shaft $a^{14}$ and is normally spring-pressed laterally by the spring $h^2$ (Fig. 1). Located on the cam shaft is a cam $h^3$, adapted, at the proper time in the operation of the machine, to engage the friction roll $h^4$ on said frame and move said frame laterally against the tension of its spring so as to cause the threading cutters $a^{11}$ to be moved laterally to properly perform their threading operation. As soon as the threading operation has been completed and before the completed work is released by the carrier, it is preferable to throw the cutters out of the threads. To accomplish this there is provided on the cam shaft, $c$, a cam $h^5$, (Fig. 9 for detail) adapted at the proper time to contact with the friction roll $h^6$ on the frame, $h$, and swing the frame rearwardly; the spring $h^7$ being adapted to pull back and hold the frame in its normal position of operation.

*General operation.*—A brief description of the general operation of the machine is as follows: The work to be operated upon is fed in between the feed rollers $f$ $f^1$ in long strips of any suitable length. The feed rollers carry the work through the guides $f^{16}$ and $g^6$ until the end of the strip of wood contacts the stop, $g^{19}$. Upon the contact of the strip of wood with the stop, if the friction rolls, through any lack of proper adjustment, have not completed their intermittent revolution, the rolls will be permitted to slide by reason of the spring-pressed bearing described. When the strip of wood has been fed to the proper position, the cut-off saw, $b$, will be caused to descend and cut off that part of the strip which is in the guide way $g^6$. As soon as the cut-off saw has completed its operation, one set of the headstocks and tailstocks will be caused to engage the ends of the cut off piece of work and the said piece of work will thereupon be carried to the proper position to be operated upon by the first set of cutting tools, the carrier being automatically stopped before these tools until the piece of work has been revolved by the headstock in the manner described for the period of something over one revolution. As soon as the first set of cutting tools have completed their operation upon the piece of work, the carrier will be automatically started and revolved for another one-fourth revolution and again automatically stopped before the second set of cutting tools. In like manner the piece of work will be again revolved by the headstock before this second set of cutting tools, and as soon as the operation of this second set of tools has been completed, the carrier will be automatically started again to carry the work another one-fourth revolution of the carrier to proper position to be operated upon by the threading cutters and automatically stopped before these saws and the piece of work again revolved. As soon as the threading saws have completed their operation, the threading saws will first be thrown back out of the threads in the manner described and the carrier again started upon its intermittent movement. At a suitable point beyond the threading saws the work will be released from the headstock and tailstock by reason of the termination of the track, $e^{26}$, about which the tailstocks ride.

It will be understood that there will be four pieces of work being operated upon at the same time, one set of the headstocks and tailstocks being in the act of grasping a piece of work and the other three sets of headstocks and tailstocks being employed in holding and revolving a piece of work before the respective cutting and threading tools.

It will be understood that while we have shown in the present machine four sets of headstocks and tailstocks on the revolving carrier, any number may be employed, the adjustment of the respective parts of the machine being varied, of course, correspondingly. For instance if six sets of headstocks and tailstocks were employed on the revolving carrier, it would be necessary to provide for giving the carrier six intermittent stop-and-start movements during one complete revolution of the same. Likewise, five or less different sets of tools would be provided, arranged at the respective points of stoppage of the carrier and also in such a case, the gear carrying the cam for throwing the clutches into engagement would revolve six times as fast as the carrier, the cam for the cut-off saw operate six times instead of four to throw the cut-off saw into operation and the machine otherwise modified in a way which will be well understood. These cutting tools may be of any desired form to give to the work any desired conformation. The threading cutters described are only used when it is desired to provide the work with threads as in the case when the machine is making insulator pins, and if it is desired cutters may be provided in place of these threading cutters, in which case the movable supporting frame would be dispensed with.

Having thus described our invention, we claim:

1. In a many spindle lathe, comprising a carrier, driving mechanism for said carrier, means for automatically engaging said mechanism with said carrier, and means operated by the carrier for disengaging said mechanism, substantially as specified.

2. In a many spindle lathe, a carrier, continuously rotating cutting tools coöperating with said carrier, driving mechanism for said carrier, means for automatically engaging said driving mechanism with said carrier, and means operated by said carrier for disengaging said mechanism at predetermined points determined by the position of said tools, substantially as specified.

3. In a many spindle lathe, a rotatable carrier, a series of cutting tools coöperating therewith, a series of work engaging devices on said carrier, driving mechanism for said carrier, means for automatically throwing said driving mechanism into engagement with said carrier, and means operated by said carrier for throwing said driving mechanism out of engagement therewith when said devices have reached the point determined by the position of said cutting tools, substantially as specified.

4. In a many spindle lathe, a rotatable carrier, a series of cutting tools arranged about said carrier, a shaft having a driving engagement with said carrier, continuously rotating driving mechanism for said shaft, means for automatically throwing said mechanism into engagement with said shaft, and means operated by said carrier to disengage said mechanism from said shaft to cause said carrier to be intermittently stopped at a point to permit said work engaging device to coöperate with said cutting tools, substantially as specified.

5. In a many spindle lathe, a rotatable carrier, work engaging devices thereon, cutting tools arranged about said carrier, a shaft having a driving engagement with said carrier, driving mechanism for said shaft, said mechanism comprising a continuously rotating sprocket-wheel on said shaft, clutch faces on said shaft and sprocket-wheel, means for automatically throwing and holding said clutch faces into engagement, and means operated by the carrier for causing the disengagement of said clutch faces when said work engaging devices have reached a point co-incident with said cutting tools, substantially as specified.

6. In a many spindle lathe, a rotatable carrier, a series of work engaging devices thereon, cutting tools arranged about said carrier, a shaft, a driving mechanism for said shaft, said mechanism comprising a continuously rotating sprocket wheel on said shaft, clutch devices on said shaft and sprocket-wheel, a spring for holding said devices in disengaged position, means for automatically throwing said clutch devices into engagement, a spring operated block for holding said clutches into engagement, and means operated by the carrier for causing said block to release said clutch devices when said work engaging devices have reached a point co-incident with said cutting tools, substantially as specified.

7. In a many spindle lathe, a carrier, engaging devices thereon, cutting tools arranged about said carrier, a shaft, a driving mechanism for said shaft, said mechanism comprising a continuously rotating sprocket wheel, clutches on said shaft and sprocket wheel normally held in disengaged position, means for automatically throwing and holding said clutch devices into engagement, means for permitting a limited movement of said shaft clutch with respect to said shaft, and means for disengaging said clutches at predetermined times, substantially as specified.

8. In a many spindle lathe, the combination of a work carrier, work engaging devices on said carrier, work feeding and holding mechanisms, said holding mechanism comprising a guide-way, said guide-way having a movable bottom, a cut-off saw together with means for operating the same after the work has been fed into said guide-way, means for operating said movable bottom to permit the cut-off piece of work to drop from said guide-way, a yieldable device for catching and retaining said work when released from said guide-way, and means for causing said work engaging devices to engage and carry the work from said yieldable device.

9. In a many spindle lathe, an intermittently rotating work carrier, work engaging devices on said carrier, work feeding mechanism, said feeding mechanism comprising intermittently rotating feed rolls, means for operating said feed rolls during each intermittent rotation of said carrier, an intermittently operated cut-off saw, a guide-way having a movable bottom arranged adjacent said feed rolls, means for operating said cut-off saw after the work has been fed into said guide-way by said feed rolls, yieldable holding devices arranged adjacent said guide-way, means for operating said movable bottom to permit the cut-off piece of work to drop onto said holding devices, and means for causing the work engaging devices on said carrier to engage and carry the cut-off piece of work from said holding devices.

10. In a many spindle lathe, a rotatable work carrier, a series of work engaging devices thereon, means for intermittently starting and stopping said carrier, a series of continuously rotating cutting tools arranged about said carrier, work feeding rolls, means connected with said carrier for rotating said rolls during each intermittent movement of said carrier, work holding devices to receive the work from said feed rolls, a cut-off saw together with means for operating the same to cut off the work after it has been fed into said holding devices and said feeding rolls are at rest, means for causing said work engaging devices to engage and carry the cut-off piece of work from said holding devices.

11. In a many spindle lathe, an intermittently operated work carrier, work engaging devices on said carrier, work feeding devices together with means connected with said carrier for operating the same during each intermittent movement of said carrier, work holding devices arranged adjacent said feeding devices to receive the work therefrom, a cut-off device together with means for operating the same after the work has been fed into said holding devices by said feeding devices and said feeding devices are at rest, continuously rotating cutting tools arranged at the points of stoppage of said carrier, and means for causing said work engaging devices to engage and carry the work from said holding devices, together with means for revolving said work engaging devices at each intermittent stoppage of the carrier.

In testimony whereof, we have hereunto set our hands this 6th day of July, 1909.

CHARLES C. SHEELEY.
FREDRICK J. GRUENEWALD.

Witnesses:
 CHAS. I. WELCH,
 A. H. WINDER.

---

Copies of this patent may be obtained for five cents each, by addressing the "Commissioner of Patents, Washington, D. C."